United States Patent
Brown et al.

[19]

[11] Patent Number: 5,980,757
[45] Date of Patent: Nov. 9, 1999

[54] INTERFACE DETECTION AND CONTROL SYSTEMS AND METHOD

[75] Inventors: Richard I Brown, Northbrook; John T Foley, Wheeling; Kyungoon Min, Gurnee; Mark Sahlin, Hainesville, all of Ill.

[73] Assignee: Baxter International Inc., Deerfield, Ill.

[21] Appl. No.: 08/922,880

[22] Filed: Sep. 3, 1997

Related U.S. Application Data

[63] Continuation of application No. PCT/US97/05829, Apr. 3, 1997.

[51] Int. Cl.[6] ............................ B01D 17/12; B04B 15/00; G01N 21/00
[52] U.S. Cl. ............................ 210/745; 210/94; 356/39; 250/234; 422/82.09; 436/164; 494/10
[58] Field of Search .......................... 210/94, 143, 360.1, 210/512.1, 739, 745, 767, 782, 787; 422/72, 82.05, 82.08, 82.09, 73; 436/164, 177, 172; 494/1, 10; 604/4–6; 356/39; 250/234–236; 73/1.02, 1.88

[56] References Cited

U.S. PATENT DOCUMENTS

| | | |
|---|---|---|
| 3,727,066 | 4/1973 | Louderback et al. . |
| 3,752,995 | 8/1973 | Liedholz . |
| 4,468,219 | 8/1984 | George et al. ............................ 604/66 |
| 4,810,090 | 3/1989 | Boucher et al. ........................... 356/39 |
| 4,828,716 | 5/1989 | McEwen et al. ....................... 210/745 |
| 5,104,526 | 4/1992 | Brown et al. ............................. 210/94 |
| 5,316,666 | 5/1994 | Brown et al. ............................. 210/85 |
| 5,316,667 | 5/1994 | Brown et al. ............................. 210/85 |
| 5,437,598 | 8/1995 | Antwiler ..................................... 494/1 |
| 5,478,479 | 12/1995 | Herrig .................................... 210/745 |
| 5,494,592 | 2/1996 | Latham et al. ............................... 604/4 |
| 5,496,265 | 3/1996 | Langley et al. ............................. 604/5 |
| 5,573,678 | 11/1996 | Brown et al. ........................... 210/782 |
| 5,605,842 | 2/1997 | Langley et al. .......................... 436/177 |
| 5,611,997 | 3/1997 | Langley et al. ............................ 422/73 |
| 5,637,082 | 6/1997 | Pages et al. ................................ 604/6 |
| 5,639,382 | 6/1997 | Brown .................................... 210/739 |
| 5,656,163 | 8/1997 | Brown ...................................... 210/94 |
| 5,658,240 | 8/1997 | Urdahl et al. .............................. 604/5 |
| 5,681,273 | 10/1997 | Brown .................................... 604/6 |
| 5,730,883 | 3/1998 | Brown .................................... 210/739 |
| 5,769,811 | 6/1998 | Stacey et al. ............................... 604/4 |
| 5,792,372 | 8/1998 | Brown et al. ........................... 210/787 |
| 5,827,746 | 10/1998 | Duic .................................... 422/82.09 |

OTHER PUBLICATIONS

Liles et al. A comparative trial of granulocyte–colony–stimulating factor and dexamethasone, separately and in combination for the mobilzation of neutrophils in the peripheral blood of normal volunteers, Transfusion, vol. 37, Mar. 1997.

Dumont et al., Enhanced Flow Cytometric Method of Counting Very Low Numbers of White Cells in Platelet Products, Cytometry, 26:311–318(1996).

*Primary Examiner*—Joseph W. Drodge
*Attorney, Agent, or Firm*—Daniel D. Ryan; Bradford R. L. Price; Denise M. Serewicz

[57] ABSTRACT

A viewing area in a blood separation chamber is monitored for the presence of an interface region between plasma and cellular blood components. Sensed optical density values for the viewing area are compared to a calibrated threshold value to generate a time pulse output. A calibration element derives the calibrated threshold value based upon either (i) a comparison of a sensed reference optical density value in the viewing area to an expected optical density value for the reference material, or (ii) a sensed optical density value of plasma exiting the blood separation chamber, or both.

17 Claims, 9 Drawing Sheets

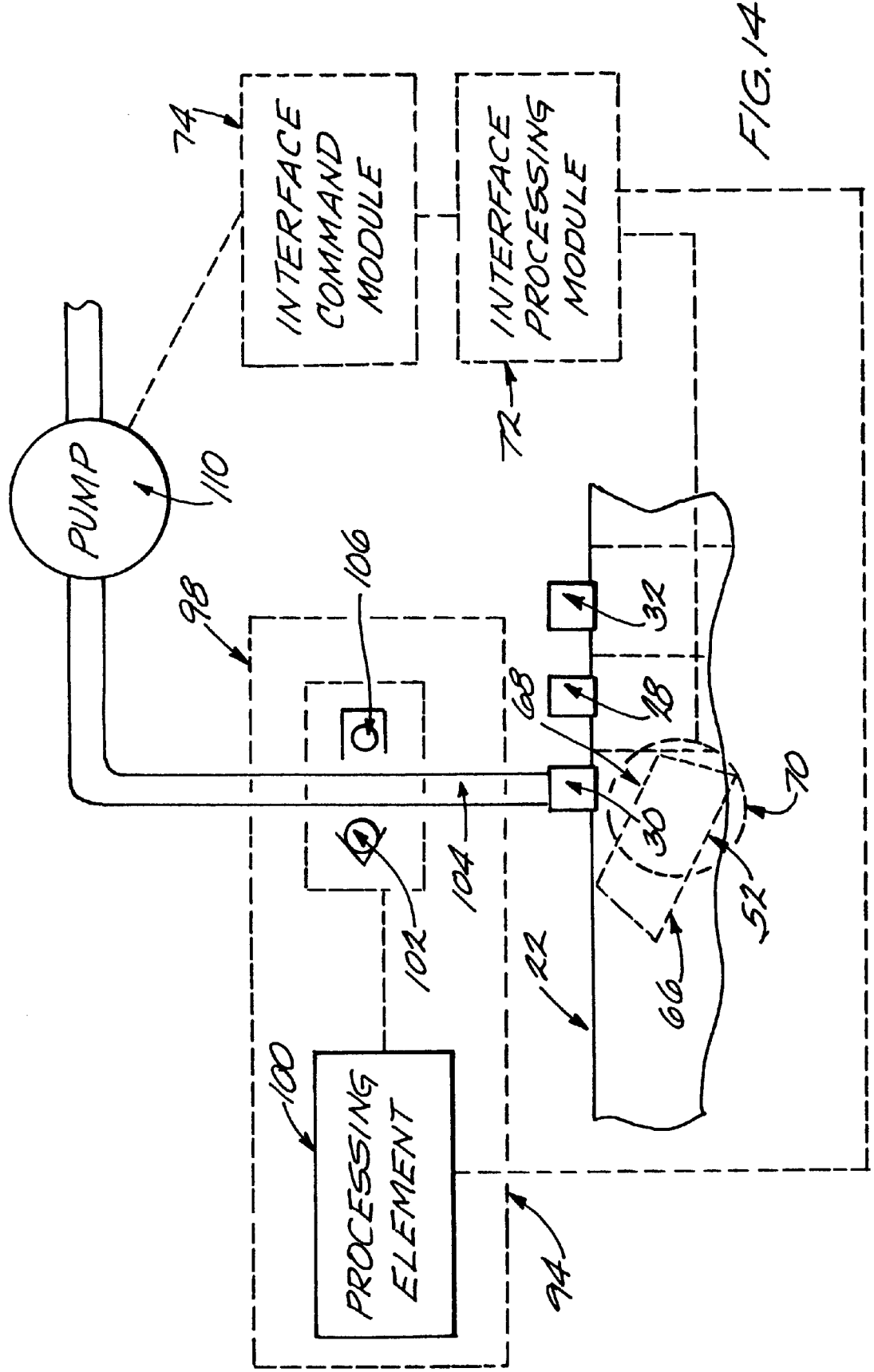

INTERFACE DETECTION AND CONTROL SYSTEMS AND METHOD

RELATED APPLICATION

This application is a continuation of international application Ser. No. PCT/US97/05829 filed Apr. 3, 1997.

FIELD OF THE INVENTION

The invention relates to centrifugal processing systems and apparatus.

BACKGROUND OF THE INVENTION

Today blood collection organizations routinely separate whole blood by centrifugation into its various therapeutic components, such as red blood cells, platelets, and plasma.

Conventional blood processing systems and methods use durable centrifuge equipment in association with single use, sterile processing chambers, typically made of plastic. The centrifuge equipment introduces whole blood into these chambers while rotating them to create a centrifugal field.

Whole blood separates within the rotating chamber under the influence of the centrifugal field into higher density red blood cells and platelet-rich plasma. An intermediate layer of white blood cells may, in some cases, form an interface between the red blood cells and platelet-rich plasma.

In conventional blood separation systems and methods, it is important to monitor the position of the interface during processing, to keep the interface and red blood cells adjacent to the interface from entering the platelet-rich plasma stream.

SUMMARY OF THE INVENTION

One aspect of the invention provides systems and methods for monitoring a viewing area in a blood separation chamber for the presence of an interface region between plasma and cellular blood components. The systems and methods use a sensor to detect optical density in the viewing area, which generates a sensed optical density signal, while moving the viewing area relative to the sensor during a time interval. The systems and methods receive as input the sensed optical density values over the time interval. The systems and methods compare the sensed optical density values to a calibrated threshold value and generate a time pulse output based upon the comparison. According to this aspect of the invention, a calibration element derives the calibrated threshold value by (i) comparing a sensed reference optical density value, generated by the detector when a reference material of known optical density occupies the viewing area, to an expected optical density value for the reference material, (ii) deriving a correction factor based upon comparing the sensed reference optical density value to the expected optical density value, and (iii) applying the correction factor to the expected optical density value to derive the calibrated threshold value. In this way, the systems and methods adjust for changes in the performance of the sensor, independent of and unrelated to changes in the optical density of the viewing area.

In a preferred embodiment, the systems and methods compare the time pulse output to a control value and generate a control output based upon the comparison. The systems and methods control blood flow within the blood separation chamber based, at least in part, upon the control output.

Another aspect of the invention provides systems and methods for monitoring the interface region between cellular constituents and plasma in a blood separation chamber. The systems and methods use a first sensor to detect optical density of the interface region to generate a sensed interface density output, and a second sensor to detect optical density of plasma exiting the blood separation chamber to generate a sensed plasma optical density output. The systems and methods move the interface region relative to the first sensor during a time interval, while a processing element receives as input the sensed interface density output over the time interval. The systems and methods compare the sensed interface density output to a threshold value and generate a time pulse output based upon the comparison. A calibration element applies a correction factor to the threshold value based, at least in part, upon the sensed plasma optical density output. In this way, the systems and methods adjust for changes in the optical density of plasma due to the presence of lipids or high concentrations of platelets.

In a preferred embodiment, the systems and methods compare the time pulse output to a control value and generate a control output based upon the comparison. The systems and methods control blood flow within the separation chamber based, at least in part, upon the control output.

Features and advantages of the inventions are set forth in the following Description and Drawings, as well as in the appended Claims.

BRIEF DESCRIPTION OF THE DRAWINGS

FIG. 14 is a schematic view of the blood calibration element, which forms a part of the interface controller.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DESCRIPTION OF THE PREFERRED EMBODIMENTS

Figure 1:
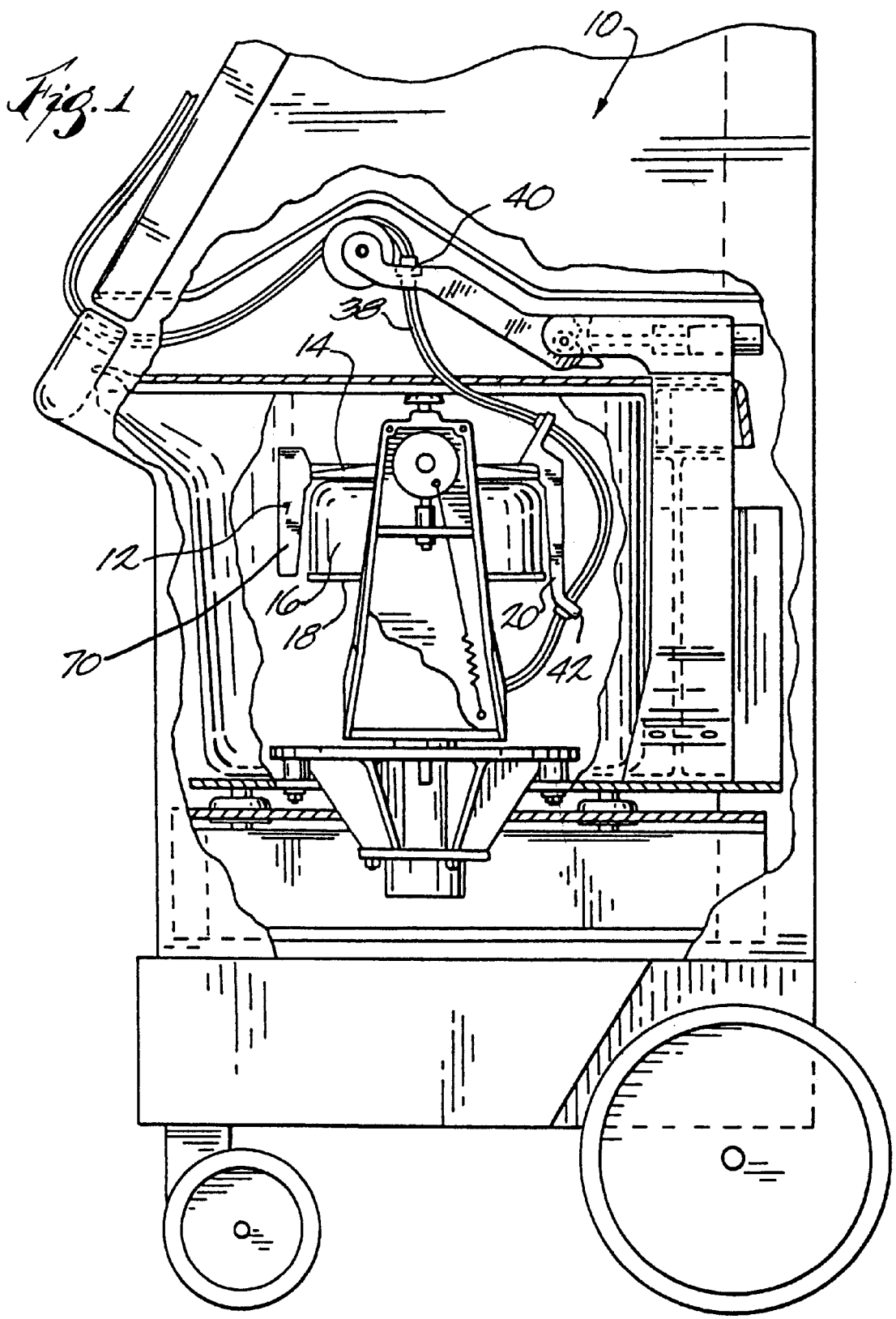
FIG. 1 is a side elevation view, with portions broken away and in section, of a blood processing system comprising a centrifuge with an interface detection system, which embodies features of the invention, the bowl and spool of the centrifuge being shown in their operating position.
Figure 2:
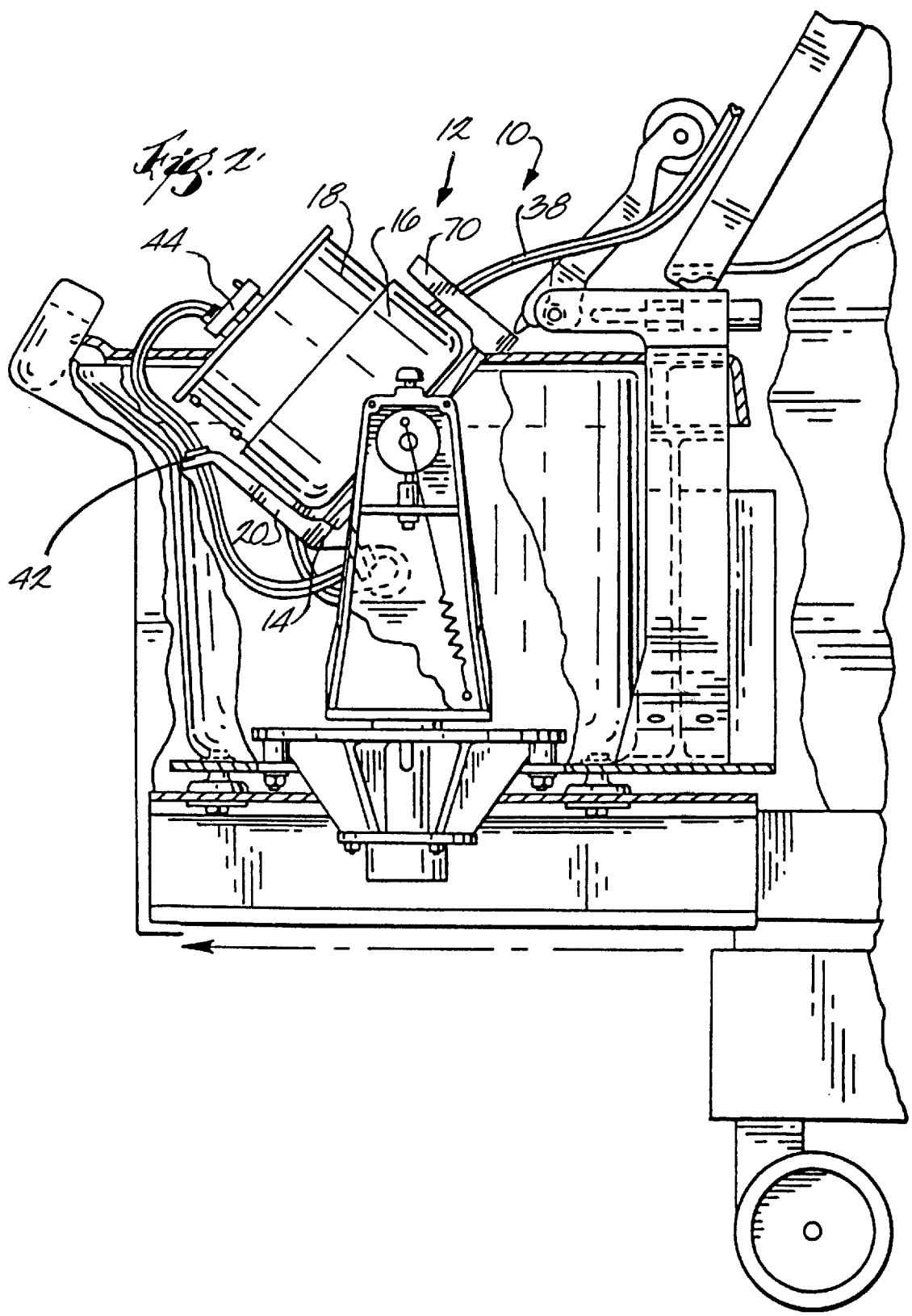
FIG. 2 is a side elevation view, with portions broken away and in section, of the centrifuge shown in FIG. 1, with the bowl and spool of the centrifuge shown in their upright position for receiving a blood processing chamber.

FIGS. 1 and 2 show a blood processing system 10, which incorporates an interface controller 12 that embodies features of the invention. The invention is described in the context of blood processing, because it is well suited for use in this environment. Still, it should be appreciated that use of the invention is not limited to blood processing. The features of the invention can be used in association with any system in which materials that can be optically differentiated are handled.

A. The Centrifuge

The system 10 includes a centrifuge 14 used to centrifugally separate blood components. In the illustrated embodiment, the centrifuge 14 separates whole blood to harvest red blood cells (RBC), platelet concentrate (PC), and platelet-poor plasma (PPP). The centrifuge 14 can also be used to harvest mononuclear cells and granulocytes from blood.

The centrifuge 14 is of the type shown in U.S. Pat. No. 5,316,667, which is incorporated herein by reference. The centrifuge comprises a bowl 16 and a spool 18. The bowl 16 and spool 18 are pivoted on a yoke 20 between an upright position, as FIG. 2 shows, and a suspended position, as FIG. 1 shows.

When upright, the spool 18 can be opened by movement at least partially out of the bowl 16, as FIG. 2 shows. In this position, the operator wraps a flexible blood processing chamber 22 (see FIG. 3) about the spool 18. Closure of the spool 18 and bowl 16 encloses the chamber 22 for processing. When closed, the spool 18 and bowl 16 are pivoted into the suspended position for rotation about an axis.

B. The Blood Processing Chamber

Figure 4:
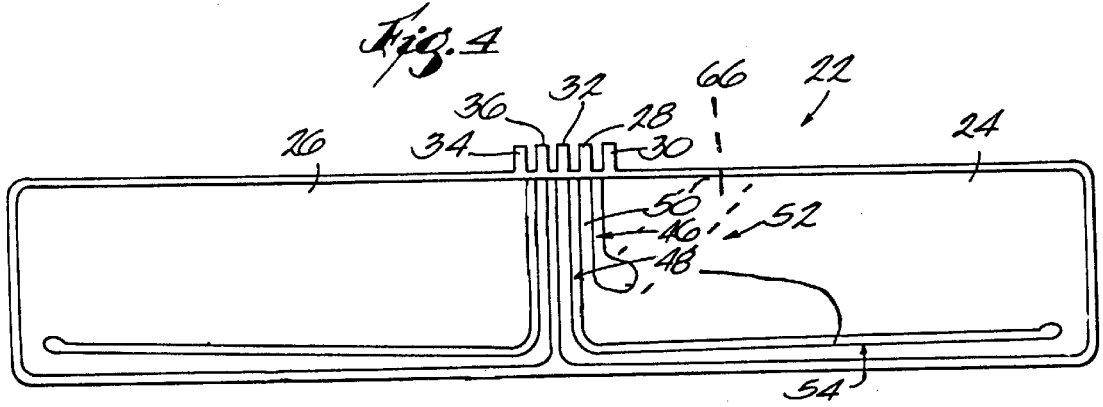
FIG. 4 is a plan view of the blood processing chamber shown in FIG. 3, out of association with the spool.

The blood processing chamber 22 can be variously constructed. FIG. 4 shows a representative preferred embodiment.

The chamber 22 shown in FIG. 4 provides multi-stage processing. A first stage 24 separates WB into RBC and platelet-rich plasma (PRP). A second stage 26 separates the PRP into PC and PPP.

Figure 3:
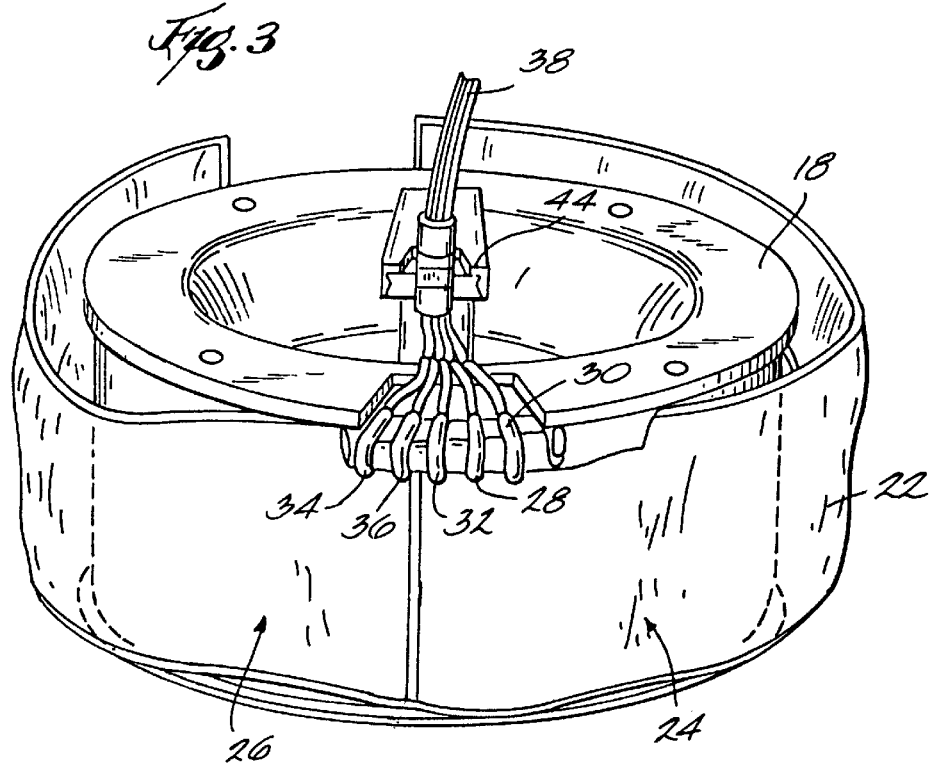
FIG. 3 is a top perspective view of the spool of the centrifuge shown in FIG. 2, in its upright position and carrying the blood processing chamber.

As FIGS. 3 and 4 best show, a port 28 conveys WB into the first stage 24. Ports 30 and 32, respectively, convey PRP and RBC from the first stage 24. RBC is returned to the donor. A port 34 conveys PRP into the second stage 26. A port 36 conveys PPP from the second stage 26, leaving PC in the second stage 26 for resuspension and transfer to one or more storage containers. The ports 28, 30, 32, 34, and 36 are arranged side-by-side along the top transverse edge of the chamber 22.

As FIGS. 1 and 3 best show, a tubing umbilicus 38 is attached to the ports 28, 30, 32, 34, and 36. The umbilicus 38 interconnects the first and second stages 24 and 26 with each other and with pumps and other stationary components located outside the rotating components of the centrifuge 14 (not shown). As FIG. 1 shows, a non-rotating (zero omega) holder 40 holds the upper portion of the umbilicus 38 in a non-rotating position above the suspended spool 18 and bowl 16. A holder 42 on the yoke 20 rotates the mid-portion of the umbilicus 38 at a first (one omega) speed about the suspended spool 18 and bowl 16. Another holder 44 (see FIG. 2) rotates the lower end of the umbilicus 38 at a second speed twice the one omega speed (the two omega speed), at which the suspended spool 18 and bowl 16 also rotate. This known relative rotation of the umbilicus 38 keeps it untwisted, in this way avoiding the need for rotating seals.

As FIG. 4 shows, a first interior seal 46 is located between the PRP collection port 30 and the WB inlet port 28. A second interior seal 48 is located between the WB inlet port 28 and the RBC collection port 32. The interior seals 46 and 48 form a WB inlet passage 50 and a PRP collection region 52 in the first stage 24. The second seal 48 also forms a RBC collection passage 54 in the first stage 24.

Figure 5:
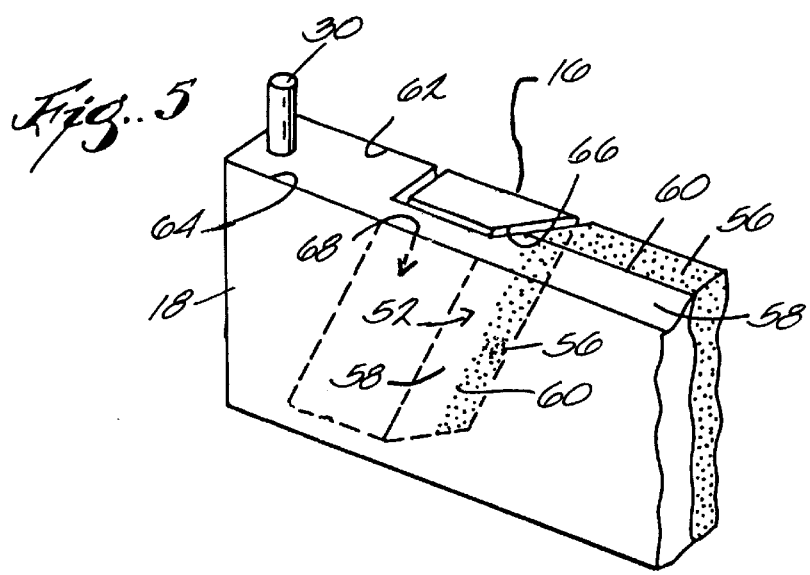
FIG. 5 is an enlarged perspective view of the interface ramp carried by the centrifuge in association with the blood processing chamber, showing the centrifugally separated red blood cell layer, plasma layer, and interface within the chamber when in a desired location on the ramp.

The WB inlet passage 50 channels WB directly into the circumferential flow path immediately next to the PRP collection region 52. As shown in FIG. 5, the WB separates into an optically dense layer 56 of RBC, which forms as RBC move under the influence of centrifugal force toward the high-G wall 62. The movement of RBC 56 displaces PRP radially toward the low-G wall 64, forming a second, less optically dense layer 58.

Centrifugation of WB also forms an intermediate layer 60, also called the interface, which constitutes the transition between the formed cellular blood components and the liquid plasma component. RBC typically occupy this transition region. White blood cells may also occupy this transition region.

Platelets, too, can leave the PRP layer 58 and settle on the interface 60. This settling action occurs when the radial velocity of the plasma near the interface 60 is not enough to keep the platelets suspended in the PRP layer 58. Lacking sufficient radial flow of plasma, the platelets fall back and settle on the interface 60. Larger platelets (greater than about 30 femtoliters) are particularly subject to settling on the interface 60. However, the closeness of the WB inlet region 50 to the PRP collection region 52 in the chamber 22 shown in FIG. 4 creates strong radial flow of plasma into the PRP collection region 52. The strong radial flow of plasma lifts platelets, large and small, from the interface 60 and into the PRP collection region 52.

Further details of the separation chamber 22 are not material to the invention and can be found in U.S. Pat. No. 5,316,667, previously mentioned.

C. The Interface Controller

As FIG. 5 shows, a ramp 66 extends from the high-G wall 62 of the bowl 16 at an angle across the PRP collection region 52. The angle, measured with respect to the axis of the PRP collection port 30 is preferably about 30°. FIG. 5 shows the orientation of the ramp 66 when viewed from the low-G wall 64 of the spool 18. FIG. 4 shows, in phantom lines, the orientation of the ramp 66 when viewed from the high-G wall 62 of the bowl 16.

Further details of the angled relationship of the ramp 66 and the PRP collection port 30 are not material to the invention. They can be found in copending U.S. patent application Ser. No. 08/472,561, filed Jun. 7, 1995, and entitled "Enhanced Yield Blood Processing System with Angled Interface Control Surface," which is incorporated herein by reference.

The ramp 66 forms a tapered wedge that restricts the flow of fluid toward the PRP collection port 30. The top edge of the ramp 66 extends to form a constricted passage 68 along the low-G wall 64. PRP must flow through the constricted passage 68 to reach the PRP collection port 30.

As FIG. 5 shows, the ramp 66 diverts the fluid flow along the high-G wall 62. This flow diversion changes the orientation of the interface 60 between the RBC layer 56 and the PRP layer 58 within the PRP collection region 52. The ramp 66 thereby displays the RBC layer 56, PRP layer 58, and interface 60 for viewing through the low-G wall 64 of the chamber 22.

The interface controller 12 includes a viewing head 70 (see FIGS. 1 and 8) carried on the yoke 20. The viewing head 70 is oriented to optically view the transition in optical density between the RBC layer 56 and the PRP layer 58 on the ramp 66. The interface controller 12 also includes a processing element 72 (see FIGS. 11 and 13), which analyzes the optical data obtained by the viewing head 70 to derive the location of the interface 60 on the ramp 66 relative to the constricted passage 68.

Figure 6:
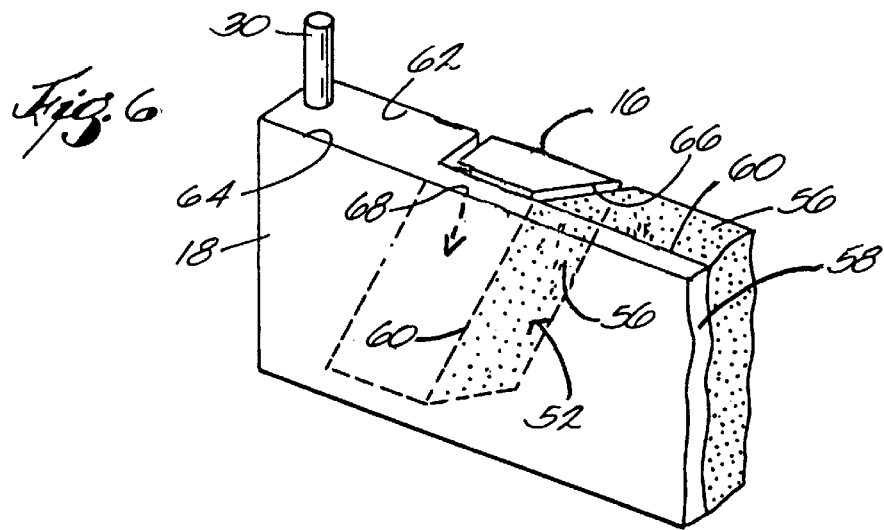
FIG. 6 is an enlarged perspective view of the interface ramp shown in FIG. 5, showing the red blood cell layer and interface at an undesired high location on the ramp.
Figure 7:
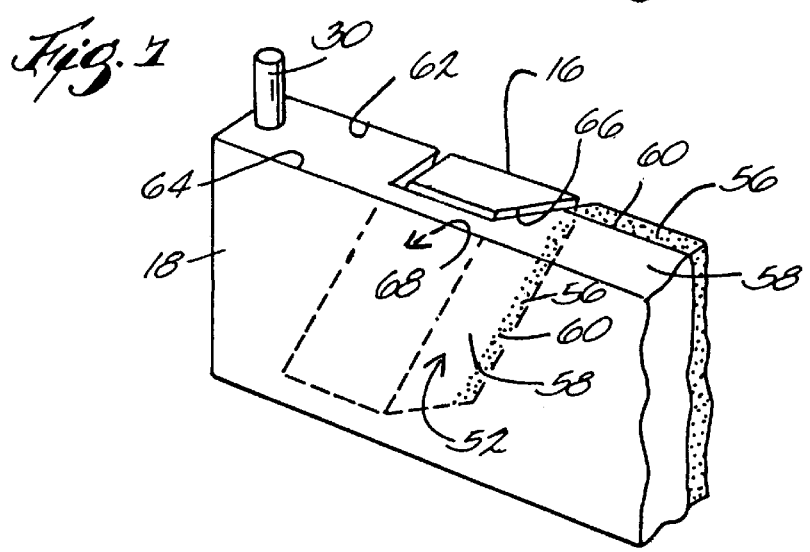
FIG. 7 is an enlarged perspective view of the interface ramp shown in FIG. 5, showing the red blood cell layer and interface at an undesired low location on the ramp.

The location of the interface 60 on the ramp 66 can dynamically shift during blood processing, as FIGS. 6 and 7 show. The interface controller 12 includes a command element 74 (see FIGS. 11 and 13), which varies the rate at which PRP is drawn from the chamber 22 to keep the interface 60 at a prescribed location on the ramp 66 (which FIG. 5 shows).

Maintaining the interface 60 at a prescribed location on the ramp 66 is important. If the location of the interface 60 is too high (that is, if it is too close to the constricted passage 68 leading to the PRP collection port 30, as FIG. 6 shows), RBC, and, if present, white blood cells can spill over and into the constricted passage 68, adversely affecting the quality of PRP. On the other hand, if the location of the interface 60 is too low (that is, if it resides too far away from the constricted passage 68, as FIG. 7 shows), the fluid dynamics advantageous to effective platelet separation can be disrupted. Furthermore, as the distance between the interface 60 and the constricted passage 68 increases, the difficulty of drawing larger platelets into the PRP flow increases. As a result, a distant interface location results in collection of only the smallest platelets, and overall platelet yield will, as a consequence, be poor.

(1) The Interface Viewing Head

Figure 8:
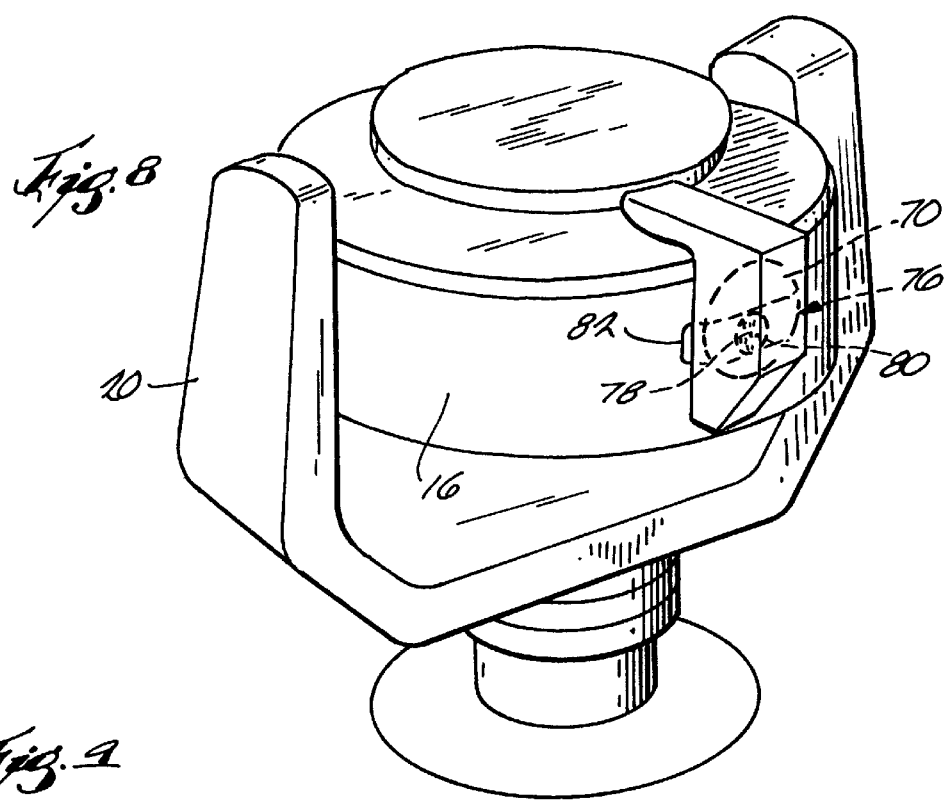
FIG. 8 is a side perspective view of the bowl and spool of the centrifuge when in the operating position, showing the viewing head, which forms a part of the interface controller, being carried by the centrifuge to view the interface ramp during rotation of the bowl.
Figure 9:
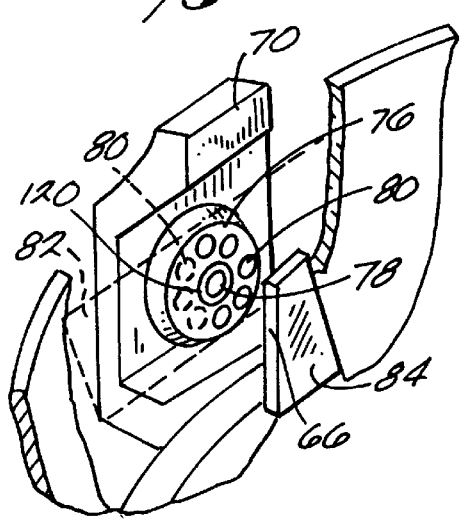
FIG. 9 is a perspective view of the viewing head, with portions broken away and in section, showing the light source and light detector, which are carried by the viewing head, in alignment with the interface ramp, as viewed from within the spool and bowl of the centrifuge.
Figure 10:
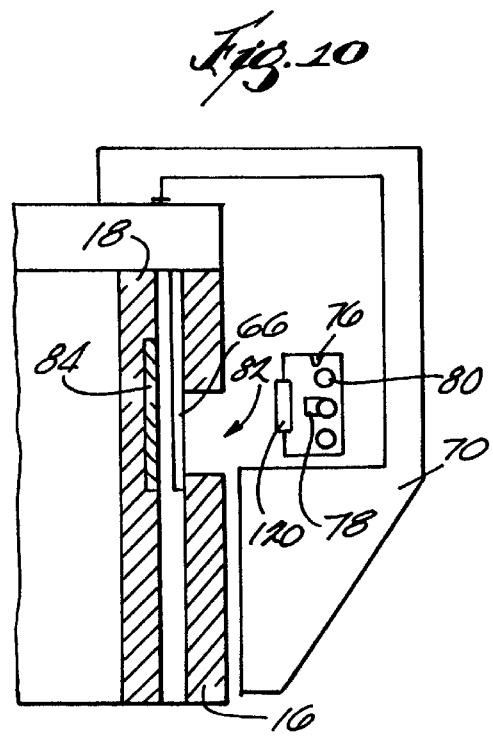
FIG. 10 is a side section view of the bowl, spool, and viewing head when the viewing head is aligned with the interface ramp.

Referring to FIGS. 8 to 10, the viewing head 70, carried by the yoke 20, includes a light source 76, which emits light that is absorbed by RBC. In the illustrated and preferred embodiment, the light source 76 includes a circular array of red light emitting diodes 80. of course, other wavelengths absorbed by RBC, like green or infrared, could be used.

In the illustrated embodiment, seven light emitting diodes 80 comprise the light source 76. More diodes 80 may be used, or fewer diodes 80 can be used, depending upon the optical characteristics desired.

The viewing head 70 also includes a light detector 78 (see FIGS. 9 and 10), which is mounted adjacent to the light source 76. In the illustrated and preferred embodiment, the light detector 78 comprises a PIN diode detector, which is located generally in the geometric center of the circular array of light emitting diodes 80.

The yoke 20 and viewing head 70 rotate at a one omega speed, as the spool 18 and bowl 16 rotate at a two omega speed. The light source 76 directs light onto the rotating bowl 16. In the illustrated embodiment (see FIG. 8), the bowl 16 is transparent to the light emitted by the source 76 only in the region 82 where the bowl 16 overlies the interface ramp 66. In the illustrated embodiment, the region 82 comprises a window cut out in the bowl 16. The remainder of the bowl 16 that lies in the path of the viewing head 70 comprises a light absorbing material.

The interface ramp 66 is made of a light transmissive material. The light from the source 76 will thereby pass through the transparent region 82 of the bowl 16 and the ramp 66 every time the rotating bowl 16 and viewing head 70 align. The spool 18 may also carry a light reflective material 84 behind the interface ramp 66 to enhance its reflective properties. The spool 18 reflects incoming light received from the source 76 out through the transparent region 82 of the bowl 16, where it is sensed by the detector 78. In the illustrated embodiment, light passing outward from the source 76 and inward toward the detector 78 passes through a focusing lens 120 (shown in FIGS. 9 and 10), which forms a part of the viewing head 70.

The arrangement just described optically differentiates the reflective properties of the interface ramp 66 from the remainder of the bowl 16. This objective can be achieved in other ways. For example, the light source 76 could be gated on and off with the arrival and passage of the ramp 66 relative to its line of sight. As another example, the bowl 16 outside the transparent region 82 could carry a material that reflects light, but at a different intensity than the reflective material 84 behind the interface ramp 66.

As the transparent interface region 82 of the bowl 16 comes into alignment with the viewing head 70, the detector 78 will first sense light reflected through the plasma layer 58 on the ramp 66. Eventually, the RBC layer 56 adjacent the interface 60 on the ramp 66 will enter the optical path of the viewing head 70. The RBC layer 56 absorbs light from the source 76 and thereby reduces the previously sensed intensity of the reflected light. The intensity of the reflected light sensed by the detector 78 represents the amount of light from the source 76 that is not absorbed by the RBC layer 56 adjacent to the interface 60.

(2) The Interface Processing Element

Figure 11:
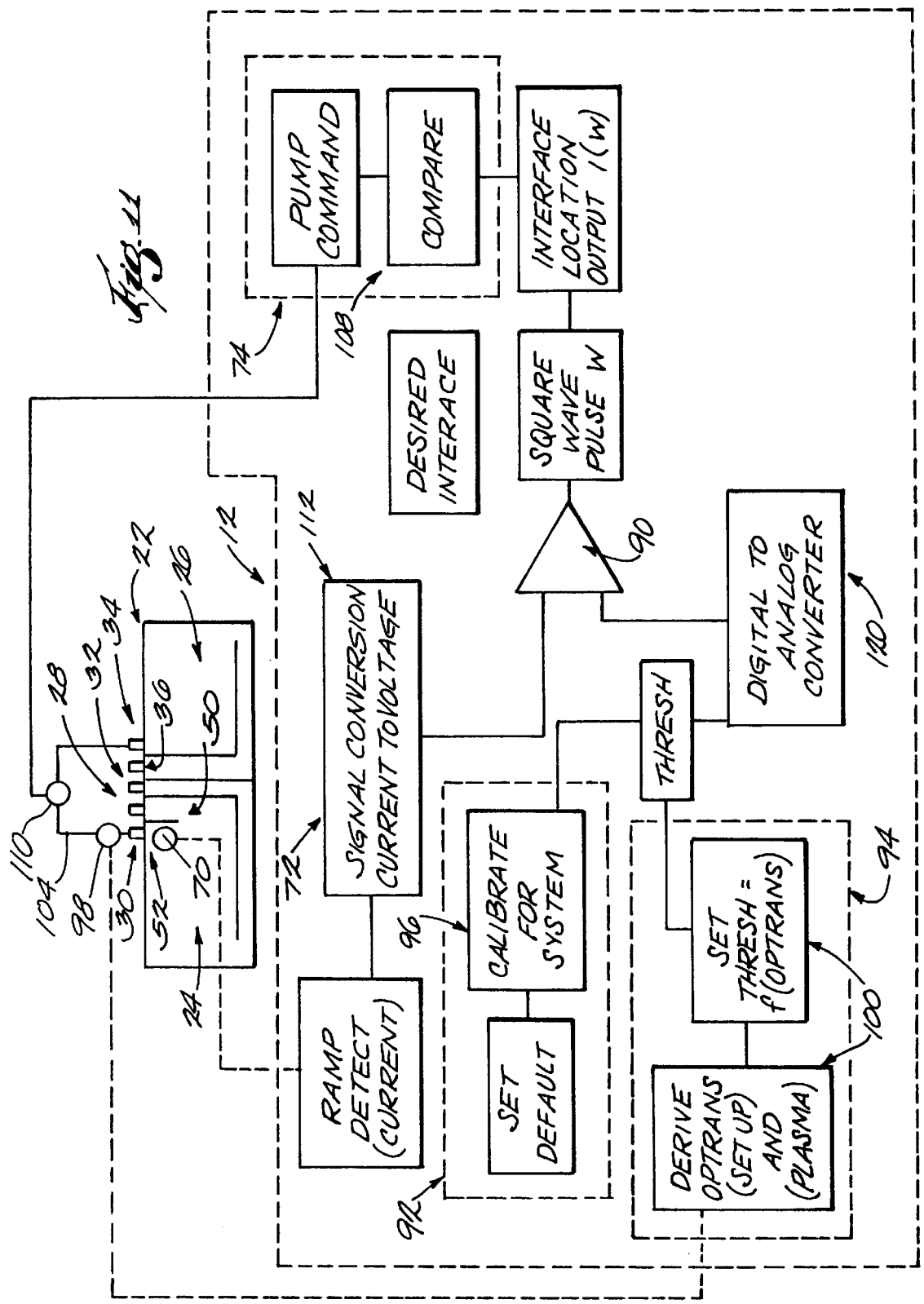
FIG. 11 is a schematic view of the interface processing element and the interface command element, which form a part of the interface controller.

As FIG. 11 shows, the interface processing element 72 includes a signal converting element 112, which converts the sensed light intensity output of the detector 78 (a current) to an amplified voltage signal.

Figure 12:
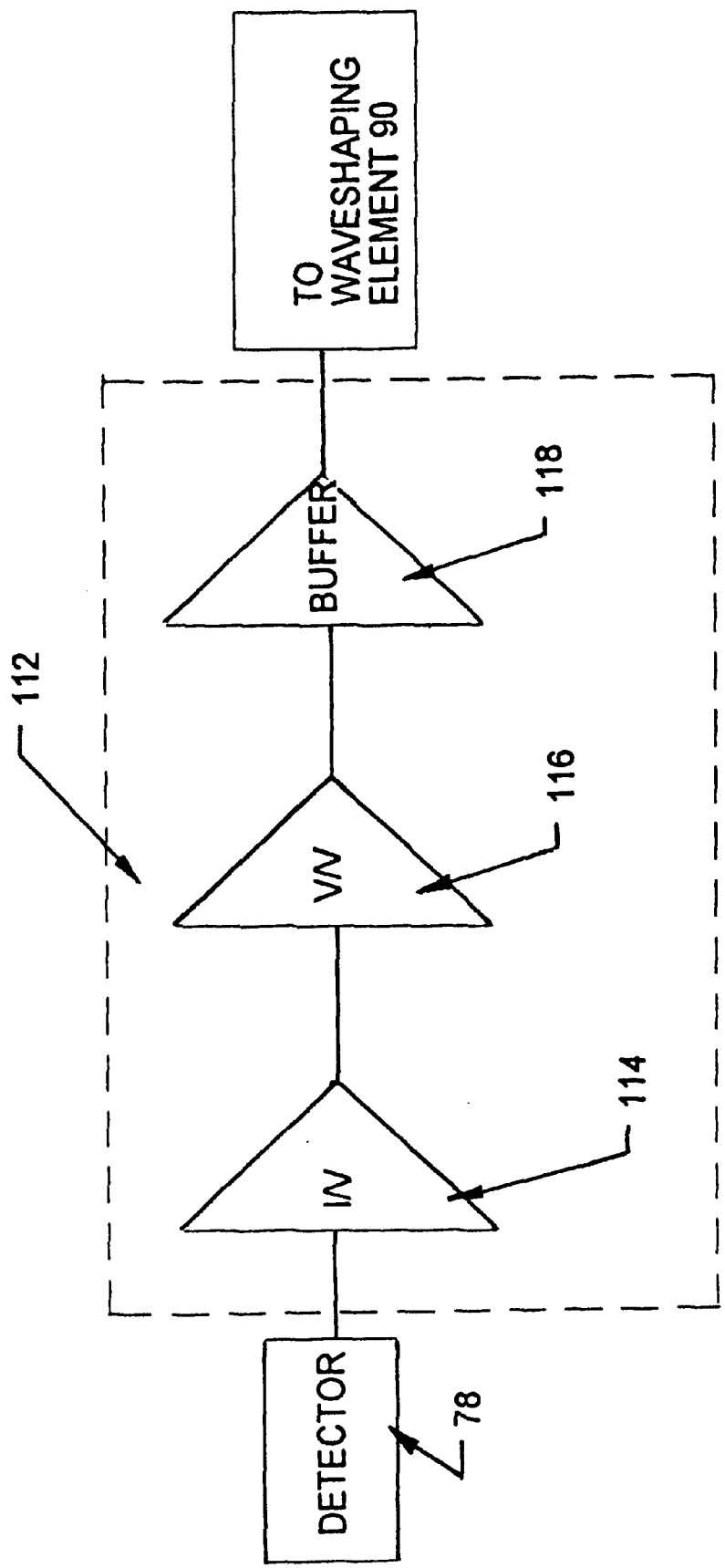
FIG. 12 is a schematic view of the signal converting element, which forms a part of the interface processing element shown in FIG. 11.

As FIG. 12 shows, the signal converting element 112 includes an inverting current to voltage (I/V) amplifier 114, which converts the relatively low positive current signal from the detector 78 (typically, in $\mu A$) to an amplified negative voltage signal. The current-to-voltage gain of the amplifier 114 can vary. In a representative embodiment, the gain is on the order of 58,000, so that current of, for example, 1 $\mu A$ is converted to a voltage signal of −58 mV. A non-inverting voltage amplifier (V/V) 116 further amplifies the negative voltage signal (in mV) to a negative voltage signal (in V) (i.e., a gain of about 400). This twice amplified negative voltage signal is passed through a buffer 118. The output of the buffer 118 constitutes the output of the signal converting element 112. In the illustrated embodiment, the total amplification factor (from detector current signal to processed negative voltage signal) is about 23 million.

Figure 13:
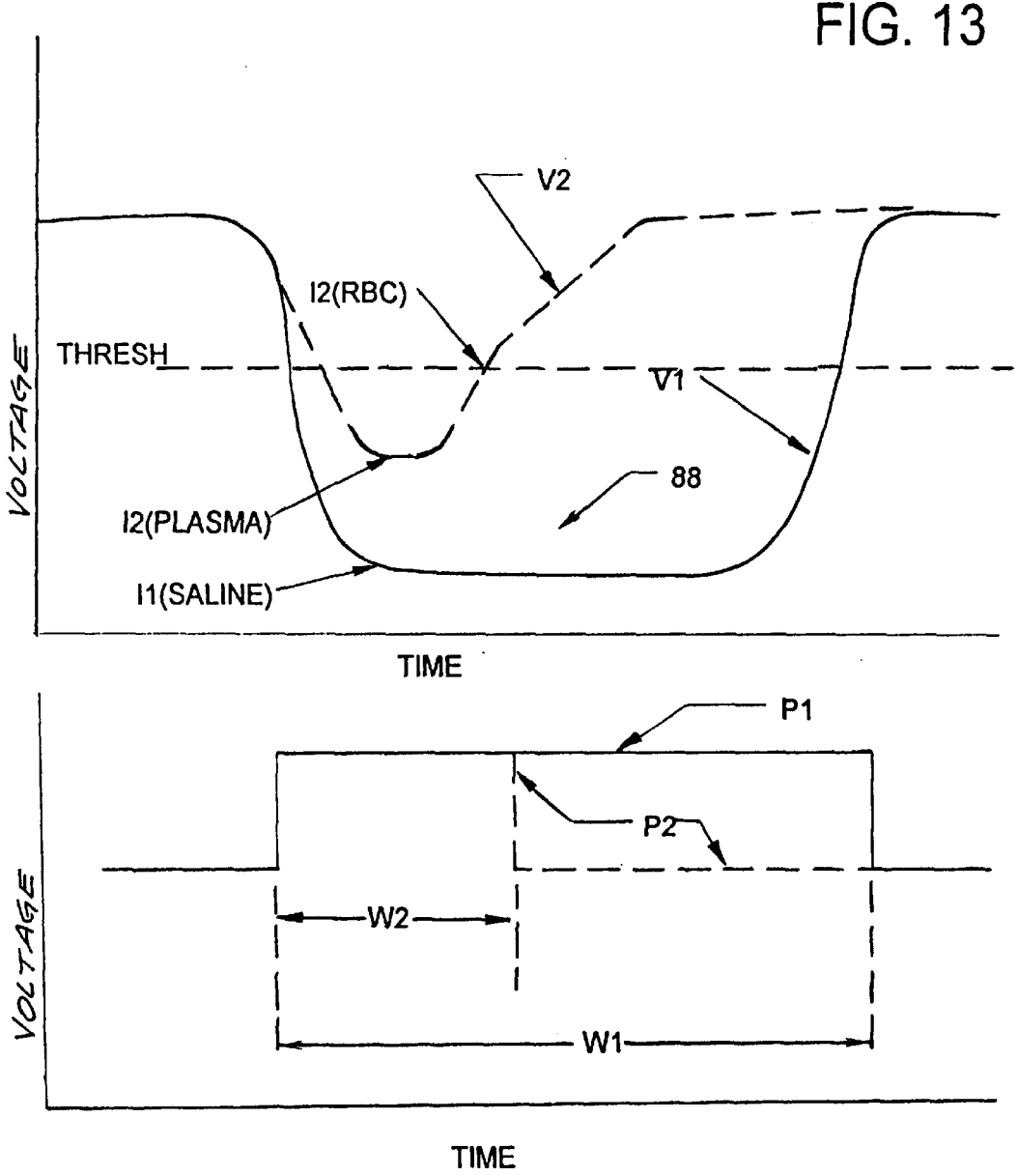
FIG. 13 shows, in its upper portion, a voltage signal generated by the viewing head when passing along the interface ramp and, in its lower portion, a square waveform, which the processing element of the interface controller generates from the voltage signal for the purpose of analyzing the location of the interface on the ramp.

FIG. 13 shows in solid lines a representative curve (designated V1), which plots representative negative voltage outputs of the signal converting element 112 for light signals detected when a light transmissive liquid, e.g., saline, resides along the entire length of the ramp 66. The curve V1 shows the region 88 where the light signal detected increase, level out, and then decrease, as the transparent region 82 and viewing head 70 pass into and out of alignment. In the illustrated embodiment, the voltage curve V1 is negative-going for increasing light signals, due to processing by the signal converting element 112. It should be appreciated that the light signals could be processed to provide a non-inverted voltage output, so that the voltage curve V1 would be positive-going for increasing light signals.

Referring back to FIG. 11, a waveshaping element 90 converts the amplified voltage signals to a square wave time pulse. In the illustrated embodiment, the element 90 comprises a voltage comparator, which receives as input the amplified voltage signals and a selected threshold value (THRESH). The output of the voltage comparator 88 is one (1) when the voltage signal lies below THRESH (that is, when the voltage signal lies further from zero than THRESH) and zero (0) when the voltage signal lies above THRESH (that is, when the voltage signal lies closer to zero than THRESH).

In the illustrated embodiment, THRESH comprises a digital number between 0 and 4095. The digital number is converted by a 12 bit digital-to-analog converter 120 to a voltage analog value between +10 and −10. For example, a digital number of zero (0) for THRESH represents an analog output of +10 V, while a digital number of 4095 for THRESH represents an analog output of −10 V.

FIG. 13 shows in solid lines a representative square wave pulse (designated P1) processed by the comparator 90 from the voltage curve V1, based upon a selected value for THRESH. Negative-going voltage curve V1 varies from zero (0) (when no light is sensed by the detector 70) to −13.5 V (when maximum light is sensed by the detector 70), and THRESH is the digital number 3481, which the converter 120 converts to an analog voltage value of −7 V. The square wave pulse P1 has a width (designated W1 in FIG. 13) expressed in terms of time. The width W1 is proportional to the time that a light signal below THRESH is detected (that is, when the negative voltage signal is farther from zero (0) than analog voltage value of THRESH).

As FIG. 13 shows, maximum light is detected (negative-going voltage signal at −13.5 V) when the interface viewing region 82 and the viewing head 70 align. When a light transmissive material like saline resides along the entire interface ramp 66, the width W1 of the square wave pulse P1 is proportional to the entire time period that the interface viewing region 82 and viewing head 70 align. Width W1 will also be called the baseline pulse width, or BASE.

When material having a high-relative light absorption properties, such as RBC, occupies a portion of the ramp 66, the profile of the sensed voltages changes. FIG. 13 shows in phantom lines a representative curve (designated V2), which plots representative processed voltage signals detected when RBC occupy about 70% of the length of the ramp 66. Negative-going voltage curve V2 varies from zero (0) (when no light is sensed by the detector 70) to −9.9 V (when maximum light is sensed by the detector 70). The curve V2 follows the path of V1 until the detector 78 senses the plasma layer 58, which is not a transmissive to light as saline. The maximum sensed signal intensity for plasma ($I2_{PLASMA}$) (for example, −9.9 V) is therefore less than maximum sensed signal intensity for saline ($I^1 SALINE$) (for example −13.5 volts). The time period during which $I2_{PLASMA}$ exists is also significantly shorter than the time period which $I1_{SALINE}$ exists. Curve V2 shows the gradual decrease in the sensed voltage signal as the light absorbing RBC layer 56 comes progressively into the field of view of the head 70 (which is generally designated $I2_{RBC}$ in FIG. 13). Curve V2 eventually joins the path of curve V1, as the transparent region 82 and viewing head 70 pass out of alignment.

FIG. 13 also shows in phantom lines that the relative width (W2) of square wave pulse (P2), processed by the comparator 90 using the same THRESH as P1, shortens. The width (W2) diminishes in proportion to the width of the RBC layer 56 relative to the width of the plasma layer 58 on the ramp. As the RBC layer 56 occupies more of the ramp 66, i.e., as the RBC-plasma interface 60 moves closer to the constricted passage 68, the pulse width (W2) shortens relative to the baseline pulse width (W1), and vice versa.

Thus, and by comparing the width of a given pulse wave (such as W2) relative to the baseline pulse width (W1), the interface processing element 72 assesses the relative physical location of the interface 60 on the ramp 66.

As FIG. 11 shows, the interface processing element 72 includes calibration modules 92 and 94 to assure that the optically derived physical location of the interface 66 accurately corresponds with the actual physical location of the interface 66. The first calibration module 92, also called the system calibration module, takes into account the geometry of the spool 18 and ramp 66, as well as operational conditions that can affect the optical acquisition of interface information. The second calibration module 94, also called the blood calibration module, takes into account the physiology of the donor's blood, in terms of the optical density of his or her plasma.

(i) System Calibration Module

The nominal value of the baseline pulse width BASE (expressed in units of time) is selected for a given system. In a representative embodiment, a value of, for example, 640 $\mu$sec can be selected for BASE. BASE (in microseconds) is converted to a digital count value (COUNTS), as follows:

$$COUNTS = \left(\frac{BASE}{PERIOD} * SCALE\right) + THRESH_{ZERO} \qquad (1)$$

where
SCALE is a selected scale factor (which, in the illustrated embodiment, can be, for example, 80604);
$THRESH_{ZERO}$ is the digital threshold number that represents an analog threshold voltage output of zero (which, in the illustrated embodiment, is 2048); and
PERIOD is the period of rotation of the detector 70, based upon the speed of rotation of the detector 70 ($DETECTOR_\Omega$), calculated as follows:

$$PERIOD = \left(\frac{60}{DECTECTOR_\Omega}\right) \times 10^6$$

Once calculated for a given $DETECTOR_\Omega$, COUNTS need not be recalculated at different values of $DETECTOR_\Omega$, provided BASE is not changed.

The system calibration module 92 derives a square pulse wave $P_{SALINE}$, like P1 in FIG. 13, by conveying a light transmissive liquid, such as saline, through the chamber 22, while sampling voltage values along the ramp 66. The voltage value samples are processed by the comparator 90 to create the square wave pulse $P_{SALINE}$, using an estimated initial threshold value $THRESH_{START}$. The width $W_{START}$ of the pulse $P_{SALINE}$ formed using $THRESH_{START}$ is measured and compared to the baseline width BASE, which is determined according to Equation (1).

Moving THRESH closer to zero than $THRESH_{START}$ will increase the pulse width, and vice versa. When $W_{START}$ does not equal BASE, or, alternatively, if $W_{START}$ falls outside a specified satisfactory range of values for BASE, the system calibration module 92 varies the threshold value from $THRESH_{START}$ to vary the pulse width, until the pulse width of $P_{SALINE}$ meets the target criteria for BASE. The threshold value that achieves the target baseline pulse width BASE becomes the default threshold value $THRESH_{DEFAULT}$ for the system.

Despite the derivation of $THRESH_{DEFAULT}$, variations in sensed pulse width can occur during normal use independent of changes in the actual physical dimension of the interface. For example, sensed voltage signals can change due to changes occurring within the viewing head 70, such as loss of focus, deposition of foreign materials on optical surfaces, shifts in optical alignment, or weakening of the light emitting diodes 80 or detector 78. Sensed voltage signals will change due to degradation of optical performance, independent of and unrelated to changes in the physical dimensions of the interface. When processed by the converter 90 using $THRESH_{DEFAULT}$, the changed voltage signals can result in a reduced or enlarged pulse width, which may no longer accurately reflect the actual state of the interface. Erroneous control signals may result.

In the illustrated and preferred embodiment, the system calibration module 92 includes a set up protocol 96. The protocol 96 sets a threshold value THRESH to obtain the baseline pulse width BASE using actual performance conditions existing at the beginning of each processing cycle.

The set up protocol 96 commands the system to convey saline (or other selected light transmissive material) through the separation chamber 22, as before described in connection with deriving $THRESH_{DEFAULT}$. A representative number of samples (e.g., 10 samples) of pulse widths $W_{DEFAULT\ (1\ to\ n)}$ are obtained based upon sensed voltage values using $THRESH_{DEFAULT}$. The sample pulse widths are averaged $W_{DEFAULT(AVG)}$ and compared to BASE for the system, derived according to Equation (1). If $W_{DEFAULT(AVG)}$ equals BASE, or, alternatively, lies within an acceptable range of values for BASE, THRESH is set at $THRESH_{DEFAULT}$.

In a representative implementation, the protocol 96 uses the following criteria is used to evaluate $THRESH_{DEFAULT}$:

IF
    $W_{DEFAULT(AVG)} \geq BASE_{LOWER}$
    AND
    $W_{DEFAULT(AVG)} \leq BASE_{UPPER}$
    THEN
        $THRESH = THRESH_{DEFAULT}$
where:
    $BASE_{UPPER}$ is a selected maximum value for the baseline pulse width, e.g., BASE times a selected multiplier greater than 1.0, for example 1.0025; and
    $BASE_{LOWER}$ is a selected minimum value for the baseline pulse width, e.g., BASE times a selected multiplier less than 1.0, for example 0.9975.

If the $W_{DEFAULT(AVG)}$ does not meet the above criteria, the set up procedure searches for a value for THRESH that brings $W_{DEFAULT(AVG)}$ into compliance with the established criteria for BASE. Various search algorithms can be used for this purpose.

For example, the set up procedure can use a half-step search algorithm, as follows:

where THRESH is the name given to the interface threshold value selected; $THRESH_{UPPER}$ is a set maximum value for THRESH; $THRESH_{LOWER}$ is a set minimum value for THRESH; and $W_{SAMPLE\ (AVG)}$ is an average of pulse widths taken during a set sample period.

set $THRESH_{n-1} = THRESH_{DEFAULT}$
set $THRESH_{UPPER}$
set $THRESH_{LOWER}$
DO n=2 to 20
    IF $W_{SAMPLE(AVG)} > BASE_{UPPER}$ THEN
        $THRESH_{LOWER} = THRESH_{n-1}$
        $THRESH_n = (THRESH_{LOWER} + THRESH_{UPPER})/2$
    ELSEIF $W_{SAMPLE(AVG)} < BASE_{LOWER}$
    THEN
        $THRESH_{UPPER} = THRESH_{n-1}$
        $THRESH_n = (THRESH_{UPPER} + THRESH_{LOWER})/2$
    ELSIF
        end the search
    ENDIF
END DO
IF n=20 THEN
    Activate a Warning Alarm: Interface Detector Problem
ENDIF The system calibration module 92 thereby assures that the optically derived location of the interface 66 is not skewed based upon operational conditions that can affect the optical acquisition of interface information.

(2) Blood Calibration Module

The interface controller 12 can operate on the premise the optical density of the donor's plasma residing on the ramp 66 is substantially equivalent to the optical density of the material (e.g., saline) used by the system calibration module 92 at the outset of a given procedure. Typically, the optical density of normal plasma can be considered equivalent to saline.

However, the optical density of plasma will vary according to the concentration of platelets carried in the plasma. Therefore, plasma particularly rich in platelets, which is a processing goal of the system 10, has a density that differs significantly from saline or normal plasma.

The optical density of plasma will also vary according to the concentration of lipids in the plasma, which depends upon the physiology or morphology of the individual donor. Lipemic plasma has a density that differs significantly from saline or non-lipemic plasma.

The presence of plasma on the ramp 66 carrying high concentrations of platelets or lipids, diminishes the magnitude of the sensed voltage signals, independent of and unrelated to changes in the physical dimensions of the interface. When processed by the converter 90 using THRESH, set by the system calibration module 92 just described, the associated square wave pulses possess a reduced pulse width. The reduced pulse width is caused by the physiology of the donor's blood, and does not accurately reflect the actual state of the interface.

For example, a RBC-plasma interface 60 located at the proper position on the ramp 66 will, in the presence of lipemic plasma or very platelet rich plasma, generate a pulse width, which is otherwise indicative for normal plasma of an RBC-plasma interface 60 that is too close. The artificially reduced pulse width will generate an error signal, which commands a reduction in the rate at which plasma is conveyed through the port 34. The previously properly positioned interface 60 is needlessly shifted to an out-of-position location down the ramp 66.

The second calibration module 94 adjusts the pulse width in the presence of plasma having an optical density significantly different than saline, to reflect the true position of the interface and thereby avoid blood-related optical distortions. The module 94 includes an optical monitor 98 (see FIG. 14), which senses the optical density of plasma exiting the plasma outlet port 30 or entering the PRP inlet port 34. In the illustrated embodiment shown in FIG. 13, the optical monitor 98 is a conventional hemoglobin detector, used on the Autopheresis-C® blood processing device sold by the Fenwal Division of Baxter Healthcare Corporation. The monitor 98 comprises a red light emitting diode 102, which emits light into the plasma outlet tubing 104. In this arrangement, the wavelength for detecting the optical density of plasma is essentially the same as the wavelength for detecting the location of the interface. Of course, other wavelengths, like green or infrared, could be used. The monitor 98 also includes a PIN diode detector 106 on the opposite side of the tubing 104.

Using the essentially the same wavelength for monitoring the interface and monitoring plasma is a preferred implementation. Using essentially the same wavelengths makes the absorbance spectrum for plasma essentially the same for both detectors. Therefore, there is no need to correlate the absorbance spectrum of the interface detector to the absorbance spectrum of the plasma detector. Of course, different wavelengths can be used, if desired, in which case the absorbance spectrums for plasma of the different wavelengths should be correlated, to achieve accurate calibration results.

The second calibration module 94 also includes a processing element 100, which receives signals from the monitor 98 to compute the optical transmission of the liquid conveyed through the tubing 104, which is called OPTTRANS. various algorithms can be used by the processing element 100 to compute OPTTRANS. In a representative embodiment, OPTTRANS is derived, as follows:

$$OPTTRANS = \frac{COR(RED\ SPILL)}{CORRREF} \quad (3)$$

where COR(RED SPILL) is calculated as follows:

COR(RED SPILL)=RED-REDKGRD where:
RED is the output of the diode detector when the red light emitting diode is on and the liquid flows through the tubing;
REDBKGRD is the output of the diode detector when the red light emitting diode is off and the liquid flows through the tubing;
and where CORREF is calculated as follows:

CORREF=REF-REBKGRD where:
REF is the output of the red light emitting diode when the diode is on; and
REFBKGRD is the output of the red light emitting diode when the diode is off.

Operating with the system calibration module 92, the processing element 100 obtains data from the monitor 98 and derives the optical transmission of the tubing and the light transmissive, set up liquid, such as saline. In a preferred embodiment, optical transmission values are calculated at the fastest possible rate during the set up procedure. The values are averaged over the entire set up procedure to derive an optical transmission value for the tubing and setup liquid ($OPTTRANS_{SETUP}$).

After set up is complete, and the system calibration module 92 is no longer operative, the blood calibration module 92 continues during subsequent blood processing to derive the optical transmission of the tubing and plasma using Equation (2). In the preferred embodiment, optical transmission values are calculated by the processing element 100 at the fastest possible rate during the blood processing procedure. The values are periodically averaged at the end of a set sampling interval (for example, every 180 seconds) to derive an optical transmission value for the tubing and plasma ($OPTTRANS_{PLASMA}$).

At the end of each set sampling interval (i.e., every 180 seconds, for example), the processing module 100 determines a new threshold value THRESH, for deriving the pulse width, which varies as a function of OPTRANS, as follows:

$$THRESH = THRESH_n - \left[\frac{1 - OPTRANS_{PLASMA}}{OPTRANS_{SETUP}}\right] * MULT \quad (3)$$

where MULT is a predetermined scale factor from 0 to, for example, 1000. In the illustrated embodiment, MULT can be set at 200.

The foregoing correction of THRESH increases the pulse width in relation to increases in optical density of plasma on the ramp 66. The second calibration module 94 thereby takes into account diminution in voltage signal gain in the presence on the ramp 66 of lipemic plasma or plasma with very high platelet counts. The second calibration module 94 thereby serves as a gain controller for the interface controller 12, adjusting the width of the pulse to accurately reflect the actual physical location of the interface on the ramp, despite the presence of plasma having greater than normal optical density.

The interface processing element 72 ultimately outputs a signal, which accurately represents the interface location as a function of W. For example, when BASE=640 μsec, a measured pulse width W indicates that 100% of the ramp 66 is occupied by plasma. A measured pulse width W of 320 μsec indicates that plasma occupies 50% of the ramp 66, while a measured pulse width W of 192 μsec indicates that plasma occupies 30% of the ramp 66 (i.e., RBC occupy 70% of the ramp 66), and so on.

The foregoing description shows the processing element 72 receiving sensed light intensity values from an interface detector 70 that senses light reflected from the interface ramp 66. It should be appreciated that comparable light intensity values can be obtained for processing by the processing element 72 from an interface detector that senses light after transmission through the interface ramp 66, without back reflection. In this alternative embodiment, a light source is carried by the yoke 20 (in the same manner as the optical head 70), and a light detector is carried by the spool 18 behind the interface ramp 66, or vice versa.

(3) Interface Command Element

As FIG. 11 shows, the interface command element 74 receives as input the interface location output of the processing element 72. The command element includes a comparator 108, which compares the interface location output with a desired interface location to generate an error signal (E). The desired interface location is expressed as a control value consistent with the expression of the interface dimension output.

Generally speaking, for platelet collection, RBC should occupy no more than about 60% to 65% of the ramp 66. This can conversely be expressed in terms of a control value (expressed as a percentage) of between 35% to 40% of BASE, meaning that the measured pulse width W should be 35% to 40% of its maximum value. Alternatively, the control value can be expressed in terms of a number representing a pulse width value (in time units) integrated to a voltage value proportional to the percentage of plasma occupying the ramp 66.

Of course, different control values can be used depending upon the particular blood component collection objectives.

When the control value is expressed in terms of a targeted RBC percentage value, a positive error signal (+E) indicates that the RBC layer 56 on the ramp 66 is too large (as FIG. 6 shows). The interface command element 74 generates a signal to reduce the rate which PRP is removed through port 34. The interface 60 moves away from the constricted passage 68 toward the desired control position (as FIG. 5 shows), where the error signal (E) is zero.

A negative error signal (−E) indicates that the RBC layer 56 on the ramp 66 is too small (as FIG. 7 shows). The interface command element 74 generates a signal to increase the rate at which PRP is removed through the port 34. The interface 60 moves toward the constricted passage 68 toward the desired control position (FIG. 5), where the error signal (E) is again zero.

The interface command element 74 can affect the rate at which plasma is removed through the port 34 by controlling the relative flow rates of WB, the RBC, and the PRP through their respective ports. In a preferred embodiment (as FIGS. 11 and 13 show), a pump 110 draws PRP via the tubing 104 through the port 34. The command element 74 controls the pump rate of the pump 110 to keep the interface 60 at the prescribed location on the ramp 66, away from the constricted passage 68.

Various features of the inventions are set forth in the following claims.

We claim:

1. A system for monitoring a viewing area in a blood separation chamber for the presence of an interface region between plasma and cellular blood components, the system comprising a sensor assembly operable to detect optical density in the viewing area and generate a sensed optical density value, a mechanism operable to move the viewing area relative to the sensor during a blood processing time interval and a set up time interval prior to the blood processing time interval, and a processing element receiving as input sensed optical density values during the blood processing time interval, the processing element including a comparator operable to compare the sensed optical density values to a calibrated threshold value and generate a time pulse output based upon the comparison, the comparator including a calibration element operable to derive the calibrated threshold value by (i) comparing a sensed reference optical density value, generated by the sensor assembly when a reference material of known optical density occupies the viewing area during the set up time interval, to an expected optical density value for the reference material selected prior to the set up time interval, (ii) deriving a correction factor based upon comparing the sensed reference optical density value to the expected optical density value, and (iii) applying the correction factor to the expected optical density value to derive the calibrated threshold value.

2. A system according to claim 1 and further including a second sensor assembly to monitor plasma exiting the blood separation chamber during the blood processing time interval and generating a plasma optical density value, and wherein the calibration element applies a second correction factor to the calibrated threshold value based upon the plasma optical density value.

3. A system according to claim 2 wherein the first mentioned sensor assembly detects optical density by transmitting energy into the viewing area at a first selected wavelength, and wherein the second sensor assembly detects optical density by transmitting energy at a second selected wavelength into plasma, the second selected wavelength being substantially the same as the first selected wavelength.

4. A system according to claim 1 wherein the processing element includes a second comparator to compare the time pulse output to a control value and generate a control output based upon the comparison.

5. A system according to claim 4 and further including a control element to control blood flow within the blood separation chamber based, at least in part, upon the control output.

6. A system for monitoring the interface region between cellular constituents and plasma in a blood separation chamber comprising a first sensor assembly operable to detect optical density of the interface region to generate a sensed interface density output, a second sensor assembly operable to detect optical density of plasma exiting the blood separation chamber to generate a sensed plasma optical density output, a mechanism operable to move the interface region relative to the first sensor during a blood processing time interval, a processing element receiving as input the sensed interface density output during the blood processing time interval and including a comparator operable to compare the sensed interface density output to a threshold value and generate a time pulse output based upon the comparison, the comparator including a calibration element operable to apply a correction factor to the threshold value based, at least in part, upon the sensed plasma optical density output generated by the second sensor assembly during the blood processing time interval.

7. A system according to claim 6 wherein the processing element includes a second comparator to compare the time pulse output to a control value and generate a control output based upon the comparison.

8. A system according to claim 7 and further including a control element to control blood flow within the blood separation chamber based, at least in part, upon the control output.

9. A system according to claim 6 wherein the first sensor assembly detects optical density by transmitting energy into the interface region at a first selected wavelength, and wherein the second sensor assembly detects optical density by transmitting energy into plasma at a second selected wavelength, which is substantially the same as the first selected wavelength.

10. An optical sensing system for a fluid processing apparatus comprising a sensor assembly operable to detect, during a fluid processing period, optical density of a first material in a viewing area and to generate a sensed optical density value based upon the detected optical density, and a processing element receiving as input the sensed optical density value during the fluid processing period, the processing element including a comparator operable to compare the sensed optical density value to a calibrated reference value and generate an output, the comparator including a calibration element operable to derive the calibrated reference value by (i) comparing a sensed reference optical density value, generated by the sensor assembly when a second material of known optical density, different than the first material, occupies the viewing area during a set up period prior to the fluid processing period, to an expected optical density value for the second material selected prior to the set up period, (ii) deriving a correction factor based upon comparing the sensed reference optical density value to the expected optical density value, and (iii) applying the correction factor to the expected optical density value to derive the calibrated reference value.

11. A method for monitoring a viewing area in a blood separation chamber for the presence of an interface region between plasma and cellular blood components, the method comprising the steps of detecting optical density in the viewing area while moving the viewing area during a blood processing period to generate a sensed optical density signal, comparing a sensed reference optical density value, generated while a reference material of known optical density occupies the viewing area during a set up period prior to the blood processing period, to an expected optical density value for the reference material selected prior to the set up period, deriving during the set up period a correction factor based upon comparing the sensed reference optical density value to the expected optical density value, applying during the set up period the correction factor to the expected optical density value to derive a calibrated threshold value, comparing sensed optical density values detected in the viewing area during the blood processing period to the calibrated threshold value, and generating a time pulse output during the blood processing period based upon the comparison.

12. A method according to claim 11 and further comprising the step of detecting the optical density of plasma exiting the blood separation chamber during the blood processing period and generating a plasma optical density value, and applying a second correction factor to the calibrated threshold value during the blood processing period based upon the plasma optical density value.

13. A method according to claim 11 and further comprising the step of comparing the time pulse output to a control value and generate a control output based upon the comparison.

14. A method according to claim 13 and further comprising the step of controlling blood flow within the blood separation chamber based, at least in part, upon the control output.

15. A method for monitoring the interface region between cellular constituents and plasma in a blood separation chamber comprising detecting with a first sensor the optical density of the interface region while moving the interface region relative to the first sensor during a blood processing period to generate a sensed interface density output, detecting with a second sensor the optical density of plasma exiting the blood separation chamber during the blood processing period to generate a sensed plasma optical density output, receiving as input the sensed interface density output during the blood processing period, comparing the sensed interface density output to a threshold value and generate a time pulse output based upon the comparison, and applying a correction factor to the threshold value based, at least in part, upon the sensed plasma optical density output.

16. A method according to claim 15 and further comprising the step of comparing the time pulse output to a control value and generate a control output based upon the comparison.

17. A method according to claim 16 and further comprising the step of controlling blood flow within the separation chamber based, at least in part, upon the control output.

* * * * *